United States Patent
Freluche et al.

(10) Patent No.: US 7,972,720 B2
(45) Date of Patent: Jul. 5, 2011

(54) METHOD OF ELECTRIC COUPLING OF A CONNECTION TO A CURRENT OUTPUT

(75) Inventors: Jean-Pierre Freluche, Angouleme (FR); Jerome Foulquier, St. Estephe (FR); Christian Dupuy, Fontenille (FR); Pierre Saunier, Bordeaux (FR); Philippe Charollais, St. Estephe (FR)

(73) Assignee: SAFT, Bagnolet (FR)

( * ) Notice: Subject to any disclaimer, the term of this patent is extended or adjusted under 35 U.S.C. 154(b) by 901 days.

(21) Appl. No.: 10/943,013

(22) Filed: Sep. 17, 2004

(65) Prior Publication Data
US 2005/0064287 A1 Mar. 24, 2005

(30) Foreign Application Priority Data
Sep. 19, 2003 (FR) ...................................... 03 11010

(51) Int. Cl.
*H01M 2/02* (2006.01)

(52) U.S. Cl. ........ 429/170; 429/151; 429/153; 429/159; 429/163; 429/181

(58) Field of Classification Search .................. 429/151, 429/159, 153, 163, 170, 181
See application file for complete search history.

(56) References Cited

U.S. PATENT DOCUMENTS
5,521,021 A 5/1996 Alexandres et al.
6,465,122 B1 * 10/2002 Kitaoka et al. .................. 429/54

FOREIGN PATENT DOCUMENTS
EP 0 494 504 A 7/1992

OTHER PUBLICATIONS
Patent Abstracts of Japan, JP 2000-277154 dated Oct. 6, 2000.
Patent Abstracts of Japan, JP2002-231216 dated Aug. 16, 2002.

* cited by examiner

*Primary Examiner* — Patrick Ryan
*Assistant Examiner* — Ben Lewis
(74) *Attorney, Agent, or Firm* — Sughrue Mion, PLLC

(57) ABSTRACT

In the production of a secondary electrochemical generator comprising a container with a casing (3) and a cover (4), the stage of electric coupling of a connection to a current output is designed so that the length of the connection does not allow it to come into contact with the current output when the cover is not in its closed position. This stage comprises the following steps: a first end (22) of the connection is electrically connected to an electrode (2), the cover is placed on the casing in order to close the container so that the second end (23) of the connection is in physical contact with the current output which is electrically insulated from the casing, and an electric current is applied between the casing and the current output so as to weld the second end of the connection to the current output.

11 Claims, 2 Drawing Sheets

METHOD OF ELECTRIC COUPLING OF A CONNECTION TO A CURRENT OUTPUT

BACKGROUND OF THE INVENTION

The invention relates to the electric coupling of an electrode connection to a current output terminal. The invention applies in particular to electrochemical generators intended for portable equipment, the capacity of which is generally less than 20 Ah, particularly for sealed cylindrical secondary electrochemical generators with spirally wound electrodes. The invention relates in particular to the method for producing this coupling.

An electrochemical generator comprises an electrochemical stack comprising an alternating sequence of positive and negative electrodes framing a separator impregnated with electrolyte. Each electrode most often comprises a metal current conductor support carrying the electrochemically active material on at least one of its surfaces. The electrode is connected electrically to a current output which ensures electrical continuity between the electrode and the external application with which the generator is associated. This current output can be the container of the generator, such as for example the cover, or a current output terminal mounted on the container.

Standard cylindrical generators generally have spiralling of an electrochemical stack forming a cylindrical body. The spiralling then comprises two electrodes with respectively positive and negative polarity framing a separator. There are several ways of electrically coupling an electrode to a current output.

One of these ways is the use of at least one thin conducting strip or thin metal band, one end of which is welded to the end face of the current conductor support of one of the electrodes and the other end is welded to the part of the current output situated inside the container, for example to the internal surface of the cover or to the internal part of a terminal.

Another method consists in bringing a flat current collector into contact with one of the flat ends of the cylindrical body formed by the winding of a portion of the current conductor support of one of the electrodes. In this case the two electrodes have a slight difference in height so that each end of the cylindrical body is formed by the spirally wound portion of the current conductor support of only one of the two electrodes. The flat current collector, in the shape of a disk for example, can itself be provided with at least one thin conducting strip connected to the current output.

In practice, in order to connect an electrode to a current output, for example to a terminal which passes through a cover, the end of the thin strip is positioned, held and fixed on the internal part of the terminal. To carry out this operation it is necessary to create a space for positioning the welding tool. During this operation the cover is in a position approximately perpendicular to its closed position. The generator is then closed using the cover which is folded down. In this embodiment, the positioning of the thin strip vis-à-vis the internal part of the terminal proves awkward. The closing of the cover engenders a complex folding of the connection which is not controlled. During this operation, there is a risk of damaging the fixing of the thin strip to the terminal, or even the thin strip itself.

For example, EP-0 818 842 discloses a cylindrical alkaline electrolyte generator comprising two spirally wound electrodes so that each end of the cylindrical body is formed by the winding of a portion of the conductor support of a single electrode. A perforated flat current collector is welded to the upper end face of the conductor support of one of the electrodes. A collecting plate connected to the flat connector is spot-welded to the internal surface of the cover while the cover is in a position perpendicular to its closed position. The cover is then folded down in order to hermetically seal the casing by means of an insulation gasket. The collecting plate has sufficient length so as to have, once folded, a fairly extensive contact surface with the internal surface of the cover. After closing the generator, a voltage of 24 Volts is applied in a discharge direction between the cover and the bottom of the casing so as to cause the flow of a current of 1 KA for 15 msec. Thus a second welding is carried out between the collecting plate and the internal surface of the cover. The electric coupling thus obtained has better mechanical strength in a vibration test. However the positioning of the collecting plate on the internal surface of the cover when closing the generator proves to be a delicate operation to carry out. Moreover when carrying out the second welding a disconnection of the first weld can occur or melting of the collecting plate if the duration and intensity of the current are not perfectly controlled.

SUMMARY OF THE INVENTION

The invention sets out to provide a method of electric coupling between a connection electrically connected to an electrode and a current output in order to produce a secondary electrochemical generator the internal impedance of which is reduced compared with the generators obtained by the known methods.

The invention provides a method for producing a secondary electrochemical generator comprising a container comprising a casing and a cover carrying a current output which is electrically insulated from the casing, and at least one electrode which is electrically connected to a connection, characterized in that it comprises a stage of electric coupling the connection to the current output comprising the following steps:
  a first end of the connection is electrically connected to the electrode,
  the cover is placed on the casing in order to close the container so that a second end of the connection is in physical contact with the current output, the length of the connection not allowing it to come into contact with the current output when the cover is not in the closed position of the generator,
  an electric current is applied between the casing and the current output so as to weld the second end of the connection to the current output.

The current output is intended to bring into an electrical relationship the cylindrical body situated inside the generator, and more specifically the electrodes, with an external application to be supplied. It can be constituted by the cover itself which is then set on the casing of the container by means of an insulation gasket, or by means of a terminal comprising a central conductive part projecting into and out of the generator and a peripheral insulation part ensuring the joint with the cover.

The advantage of the present invention is the use of a connection the length of which is much smaller than that of the connections used in the generators of the prior art. In fact, the connection of the invention has a smaller length than that which it would need to be in contact with the current output when the cover is not in its closed position. Thus it is not possible to carry out the welding of the connection on the internal part of the current output when the generator is open. The method according to the present invention allows this welding to be carried out after the generator has been closed. Once this welding has been carried out, its quality is checked with a voltage measurement which provides information on the value of the contact resistance.

The electrode comprises a conductor support, at least one surface of which is covered with a layer containing the electrochemically active material. According to a particular embodiment, the electrode is spirally wound so as to form a cylindrical body, the flat end of which is constituted by the end face of the support. The connection comprises a flat part which is welded on the end face of the electrode conductor support in order to produce the electrical connection between the connection and the electrode.

Preferably the connection comprises a flat part intended to be connected to the electrode and at least one tongue which is intended to be connected to the current output. When the cover is closed the flat part and the tongue are in different planes so that the tongue is in contact with the current output. Advantageously, the tongue is such that it forms a spring resting on the internal part of the current output. For low power generators, the contact which is thus ensured may appear to be sufficient to ensure electrical continuity. But for higher power generators the connection needs to be welded to the current output.

Preferably the voltage applied between the casing and the current output is comprised between 1.3 V and 15 V.

Preferably also the current applied between the casing and the current output comprises a current spike comprised between 500 and 15000 A.

The connections are in line connected to each other by meltable points. According to a particular embodiment of the invention, the connections are separated from each other by melting their connection points.

The invention also provides an electrochemical generator produced by the method described previously, comprising a container comprising a casing and a cover carrying a current output which is electrically insulated from the casing and at least one electrode which is electrically connected to a connection.

According to the invention the length of the connection is not sufficient for the connection to be in contact with the current output when the cover is not in its closed position. The use of a very short connection leads space saving inside the generator allowing the height of the cylindrical body to be increased and therefore an increased capacity. Thus the performance of the generator is improved in terms of volume capacity.

The connection is preferably made of stainless steel, steel, nickel-coated steel or nickel.

According to another method of carrying out the invention, the connection comprises a flat part intended to be connected to at least one electrode and at least one tongue intended to be connected to the current output.

According to another method of carrying out the invention, the electrochemical generator is cylindrical. The electrode comprises a conductor support, at least one surface of which is covered with a layer containing the electrochemically active material. The electrode is spirally wound so as to form a cylindrical body, the flat end of which is constituted by an end face of the support. Preferably the flat part of the connection is welded to the flat end of the cylindrical body.

Other characteristics and advantages of the present invention will become apparent from the following description of embodiments, provided of course by way of illustration and non-limitatively, and in the attached drawings.

DETAILED DESCRIPTION OF PREFERRED EMBODIMENTS

Figure 1:
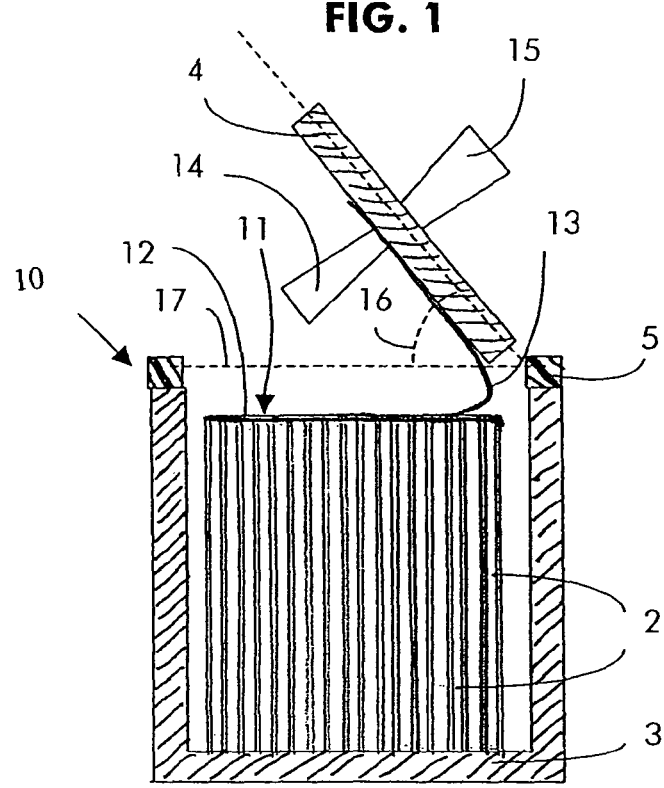
FIG. 1 is a diagrammatic cross-sectional view representing the welding of a connection to a current output according to the method of the prior art.

FIG. 1 shows in cross-section an electrochemical generator 1 comprising electrodes 2 combined in a container made up of a casing 3 and a cover 4. The casing 3 and the cover 4 are joined by means of an insulation gasket 5. The generator 1 contains a connection 11 which is made up of a flat part 12 welded to the end face of the electrodes 2 of the same polarity, and a plate 13. According to a method of the prior art, the plate 13 is welded to the cover 4 which constitutes a current output here. The plate 13 is applied to the internal surface of the cover 4. The plate 13/cover 4 assembly is pinched between an electrode 14 and a counter-electrode 15 in order to carry out the welding. During the welding operation, the cover 4 forms an angle 16 with the plane 17 of its closed position so as to clear a passage which is sufficient for the electrode 14 and the counter-electrode 15. Finally the cover 4 is folded down on the casing 3.

Figure 2:
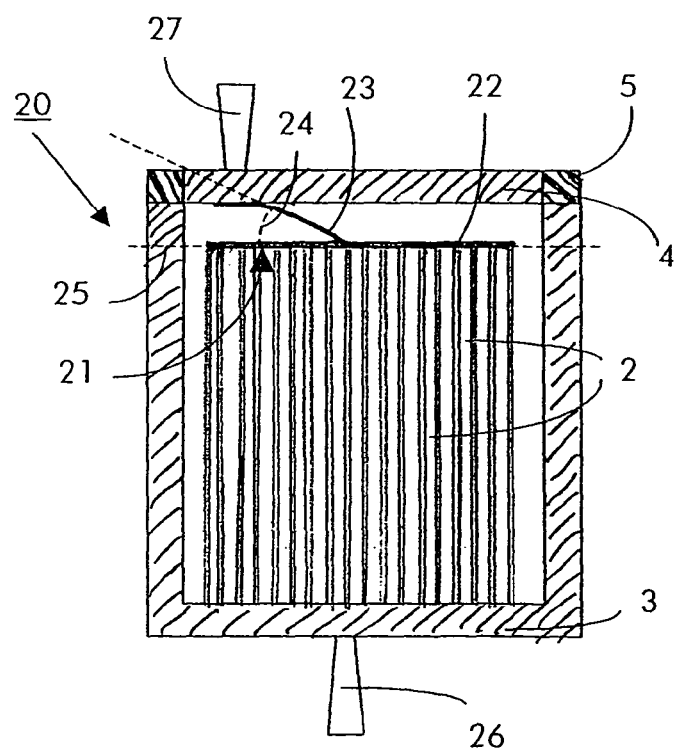
FIG. 2 is a diagrammatic cross-sectional view representing the welding of a connection to a current output according to the method of the invention.

In FIG. 2, the main elements of the generator 1 of FIG. 1 are seen. But in this case the generator 20 contains a connection 21 which is composed of a flat part 22 welded to the end face of the electrodes 2 and a short tongue 23 which forms an angle 24 with the plane 25 of the flat part. The cover 4 is folded back on the casing 3 and joins to it by means of the insulation gasket 5. The value of the angle 24 is such that once the cover 4 is in place, the tongue 23 is applied to the internal surface of the cover 4 which constitutes a current output here. By the method according to the invention, the tongue 23 is welded to the cover 4 using a first electrode 26 applied to the bottom of the casing 3 and with a second electrode 27 positioned on the external surface of the cover 4 to the right of the support area of the tongue 23 on the internal surface of the cover 4. A voltage higher than the voltage of the generator 20 is applied between the two electrodes 26, 27 for a duration of 5 msec to 30 msec with a current surge comprised between 5000 A and 15000 A.

Figure 3A:
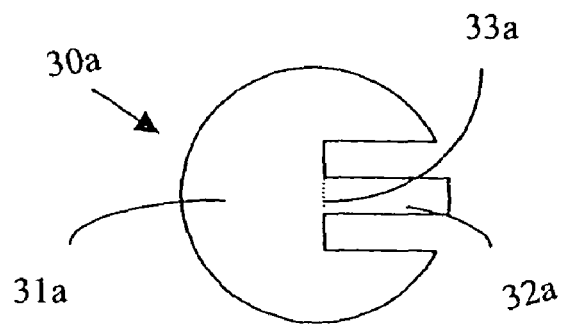
FIGS. 3A and 3B show two examples of a connection which can be used in the method according to the invention.
Figure 3B:
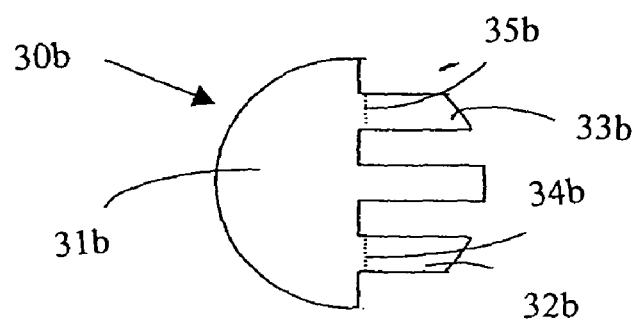

FIGS. 3A and 3B show two variants of the shape for a connection which can be used in the method according to the invention. The connection 30a comprises a flat part 31a and a tongue 32a, 32b which is lifted up along the fold line 33a into a plane forming an angle with that of the flat part 31a.

The connection 30b comprises a flat part 31b and two tongues 32b and 33b which are lifted up respectively along the fold lines 34b and 35b into a plane forming an angle with that of the flat part 31b. In this case welding is carried out by the method according to the invention respectively on each tongue 32b and 33b.

Figure 4:
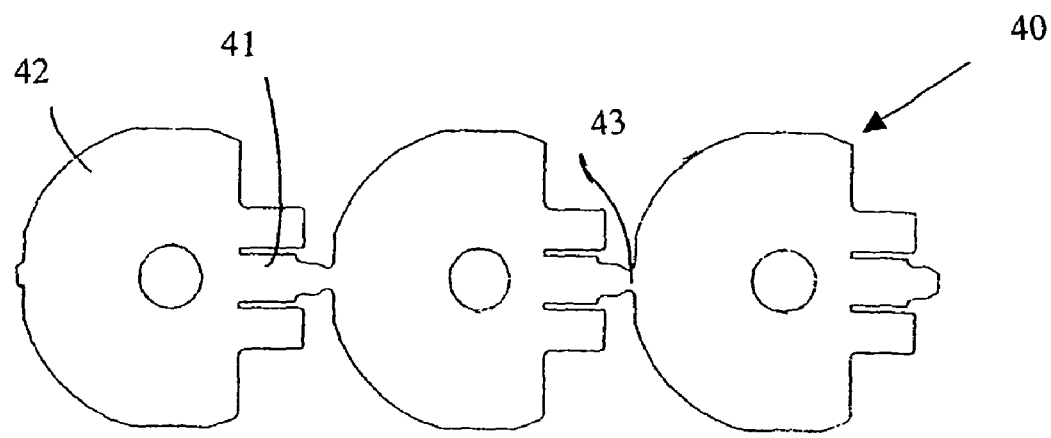
FIG. 4 shows a strip before cutting composed of several connections which can be used in the method according to the invention.

In FIG. 4 a strip of short connections 40 according to the invention is shown comprising a tongue 41 extending from a flat part 42. The connections 40 are connected to each other with a tongue 41. At the end of the tongue 41 which is connected to the flat part 42 of the neighbouring connection there are bridges 43 which are easily meltable by passing a current. The melting of the bridges 43 allows the connections 40 to be separated from one another.

The invention claimed is:

1. A method for producing a secondary electrochemical generator, said generator comprising a container having a casing and having a cover electrically insulated from said casing and carrying a current output, and at least one electrode which is electrically connected to a connection, wherein the connection is a single piece element having a first flat portion and a second tongue portion raised into a plane forming an angle relative to a plane of said first flat portion, and wherein the method comprises a stage of electric coupling of said connection to said current output comprising the following steps:

electrically connecting the first flat portion of said connection to said electrode, placing said cover on said casing in order to close said container so that an end of the tongue portion of said connection is in physical contact with said current output, and applying an electric current between said casing and said current output after said cover has reached a final closed position, so as to weld said end of said tongue portion to said current output.

2. The method according to claim 1, in which said electrode comprises a conductor support, at least one surface of which is covered with a layer containing the electrochemically active material, said electrode being spirally wound so as to form a cylindrical body, the flat end of which is constituted by an end face of said support, and in which the flat portion of the connection is welded to said end face in order to produce the electrical connection between said connection and said electrode.

3. The method according to claim 1 in which a voltage applied between said casing and said current output is higher than the voltage of said generator.

4. The method according to claim 1 in which the current applied between said casing and said current output comprises a current spike between 5,000 A and 15,000 A.

5. The method according to claim 1, wherein substantially no physical displacement occurs to said tongue portion after application of said welding current.

6. An electrochemical generator comprising a container having a casing and having a cover electrically insulated from said casing and carrying a current output, and at least one electrode which is electrically connected to a connection, wherein the connection is a single piece element having a first flat portion and a second tongue portion having an end raised relative to said flat portion, the flat portion of said connection being electrically connected to said electrode and the said end of said tongue portion being in physical contact with the current output when said cover is placed on said casing in order to close said container, wherein the end of the tongue portion is welded to said current output by applying an electric current between said casing and said current output after said cover has reached a final closed position.

7. The generator according to claim 6, in which said connection is made of a metal chosen from the group consisting of steel, stainless steel, nickel-coated steel and nickel.

8. The generator according to claim 6, in which said electrode comprises a conductor support, at least one surface of which is covered with a layer containing the electrochemically active material, said electrode being spirally wound so as to form a cylindrical body the flat end of which is constituted by an end face of said support.

9. The generator according to claim 8, in which the flat portion of said connection is welded to the flat end of said cylindrical body.

10. The generator according to claim 6, in which said connection has a folding line, the second tongue portion being lifted up along said folding line.

11. An electrochemical generator according to claim 6, wherein said tongue portion is in substantially the same position as when the welding current was applied.

\* \* \* \* \*